United States Patent [19]
Melber

[11] Patent Number: 5,580,656
[45] Date of Patent: Dec. 3, 1996

[54] PROCESS FOR DRYING MICROSPHERES

[76] Inventor: George E. Melber, 232 Claudette Ct., Buffalo, N.Y. 14043

[21] Appl. No.: 365,549

[22] Filed: Dec. 28, 1994

Related U.S. Application Data

[63] Continuation of Ser. No. 181,105, Jan. 13, 1994, abandoned, which is a continuation of Ser. No. 705,545, May 24, 1991, abandoned, and Ser. No. 490,332, Mar. 8, 1990, Pat. No. 5,180,752.

[51] Int. Cl.$^6$ .................................. B32B 5/16; C08J 9/36
[52] U.S. Cl. ..................... 428/403; 428/407; 427/222; 521/54; 521/56; 521/57; 521/58
[58] Field of Search ..................... 428/403, 407; 427/222; 521/54, 56, 57, 58

[56] References Cited

U.S. PATENT DOCUMENTS

| | | | |
|---|---|---|---|
| 4,006,273 | 2/1977 | Wolinsky | 427/278 |
| 4,722,943 | 2/1988 | Melber et al. | 521/57 |
| 4,771,079 | 9/1988 | Melber | 521/54 |
| 4,871,408 | 10/1989 | Honma et al. | 156/83 |
| 5,115,103 | 5/1992 | Yamanishi et al. | 174/24 |
| 5,180,752 | 1/1993 | Melber et al. | 428/403 |

*Primary Examiner*—Leszek Kiliman
*Attorney, Agent, or Firm*—Waldron & Associates

[57] ABSTRACT

Microsphere beads are mixed with a surface barrier liquid or mixture of such a liquid with a solid effective to prevent agglomeration and surface bonding of the microspheres; by the control of the application of heat and balancing temperature and active mixing, removal of water from the microspheres is achieved.

The surface barrier liquid or mixture of such a liquid with a solid in the present invention is any one of a wide diversity of materials which meet the requirements of the intended function, i.e., to prevent the agglomeration of the microspheres during the process. Suitable materials include, by way of example, plasticizers, diluents, extenders, monomers and oligomers, and the like.

9 Claims, 1 Drawing Sheet

PROCESS FOR DRYING MICROSPHERES

This is a continuation, of application Ser. No.: 08/181,105, filed Jan. 13, 1994, now abandoned, which is in turn a continuation of Ser. No. 07/705,545, filed: May 24, 1991, now abandoned, and continuation of Ser. No. 07/490,332, filed: Mar. 8, 1990, now U.S. Pat. No. 5,180,752.

I. BACKGROUND OF THE INVENTION

A. Introduction

The present invention relates to the drying and, optionally, to the expansion of thermoplastic microspheres.

Microspheres are heat expandable thermoplastic polymeric hollow spheres containing a thermally activatable expanding agent. Such materials, the method of their manufacture, and considerable information concerning the properties and uses of microspheres, are all set forth in U.S. Pat. No. 3,615,972, issued to Donald S. Morehouse. Other teachings concerning such materials and uses are found in, for example, U.S. Pat. Nos. 3,864,181; 4,006,273; and 4,044,176.

In following the teachings of the Morehouse patent, the microspheres are made in an aqueous system by the limited coalescence process under pressure, and the resulting product is a "wet cake" of the unexpanded microsphere beads wetting agents and water. The wet cake is typically about 40 to 75 weight percent solids, and because of the wetting agents employed in the formation of the beads, the surface will be wet. Many important uses of the microspheres require the removal of the water.

It has also become common to expand the beads before use. In unexpanded form, the dry microsphere beads typically have a displacement density of about 1.1 g/cm$^3$. Dry, expanded microspheres typically have a density by displacement generally of less than 0.06 g/cm$^3$, and are highly useful in the production of syntactic foams in a wide variety of polymer matrices. Free-flowing, expanded microspheres have now achieved a commercial recognition and market demand for such uses and others.

B. Prior Art

There have been to date few procedures by which expanded microspheres have been produced from wet cake.

The techniques in the prior art for the production of expanded microspheres are limited in at least one of two aspects: either the product remains wet, or the expanded beads are produced in dry form with substantial amounts of agglomeration and a limited degree of expansion. The "acceptable" levels of agglomeration achieved in such procedures are in the range of about 3 to 10% of the product.

In U.S. Pat. No. 4,397,799, pre-expanded, dry, low density microspheres are produced by spray drying. The spray drying procedure has several disadvantages. First and foremost, the erection of a dedicated spray drying facility is required, representing a very substantial capital investment, and very considerable operating expenses, particularly for skilled labor and utilities costs in heating the drying fluid. In addition, the product is produced entrained in a heated, moving fluid stream, and the requirements of collection, recovery and handling are considerable. In addition, it is generally not feasible to produce the expanded product at the point of use, because of the size and expense of the facility, so that the spray drying approach largely mandates shipping of large volumes at considerable expense. Not to be neglected is the requirement that the spray drying be conducted under an inert atmosphere, since the usual blowing agents entrained within the microspheres are generally highly flammable, and often explosive. The usual procedure is to employ nitrogen as the spray drying fluid, with a necessary, and highly expensive, safety burden on the system. Recovery of the expanded beads from the system is also demanding, not only to avoid product losses, but also because of the dust pollution of the working environment and atmosphere that can result. In addition, experience has shown that the spray drying technique is suited for developing expanded densities no less than about 0.032 to about 0.040 g/cm$^3$ and typically about 0.036 g/cm$^3$. Attempts at lower densities result in unacceptable levels of agglomeration, greater than about 10% of the product, and equally unacceptable product losses attributable to over-expansion, with attendant disruption of the bead structure.

Expansion of microsphere beads is attained in the process of U.S. Pat. No. 4,513,106, where the wet cake is injected into a flow stream of steam, which is subsequently quenched in cool water. This produces pre-expansion of the microspheres, but still wet with water, at low solids content. While solids contents as high as fifteen percent have been occasionally been produced, the typical product is more often about 3 to 5 percent solids. The water limits the applications to which the procedure is applicable.

In our prior U.S. Pat. No. 4,722,943, the disclosure of which is incorporated by reference herein, we disclosed a process wherein wet cake mixed with a processing aid, dried and expanded in an integral operation. In that invention, the processing aid is adhered to and embedded in the surface of the microspheres by thermal bonding, wherein the surface of the microspheres is heated to a temperature above the glass transition temperature, $T_g$, so that the polymer material behaved as a hot melt adhesive to bind the processing aid. The equipment requirements for such operations are quite substantial, the procedure is difficult to control, and the quality and uniformity of the product are difficult to maintain. When carefully controlled, the product is within the limits heretofore considered "acceptable", with agglomeration levels in the range of 3 to 10%. While the procedure of our prior patent achieved a material reduction in capital costs and operating expenses to achieve acceptable product quality, it would be desirable to reduce costs still further and to achieve higher levels of quality and productivity. It would also be desirable to achieve greater expansion of the microspheres and to permit the use of lower proportions of the adherent surface barrier liquid or mixture of such a liquid with a solid upon which the procedure is dependent. Experience has shown that when the microspheres are greater than 30% by weight of the mixture, the avoidance of acceptable levels of agglomeration becomes increasingly difficult with increasing proportions of microsphere beads. This has proved a serious problem, since it is product which is lowest in the proportion of the surface barrier liquid or mixture of such a liquid with a solid and composite density which, for the majority of uses, is the more desired product.

In related case Ser. No. 07/490,332, the disclosure of which is incorporated by reference herein, we disclosed and claimed a technique for drying and expanding thermoplastic microspheres. The present invention relates to a further development in the drying and expansion operation disclosed in that application, wherein the surface barrier coating is now, in whole or in material part, a liquid material at drying temperatures.

C. OBJECTS OF THE INVENTION

It is an object of the present invention to provide a process for continuously drying, i.e., removal of water from thermoplastic microspheres.

It is another object of the present invention to provide a process for producing microsphere beads substantially free of agglomerates and water.

A further object is to provide continuously dried and, optionally, expanded microspheres from wet cake.

It is also an object of the present invention to provide dried, water free and, optionally, expanded microspheres, by a process which is reasonably inexpensive to capitalize and operate, which can be provided at the site of use of the product at economical levels of utilization, and which can be operated with modest labor and utility costs.

It is an object of the present invention to provide free-flowing, optionally expanded, microspheres having unusual and unique properties and characteristics.

II. SUMMARY OF THE INVENTION

In the present invention, dry microspheres are dried and optionally expanded with an adherent coating of a surface barrier liquid or mixture of such a liquid with a solid by a procedure which results in the attainment of low density, as low as 0.015 to 0.020 g/cm$^3$, and with materially reduced proportions of agglomerates in the product, generally less than 1% of the product, and often less than 0.1%.

The procedure of the present invention is based on sequential or concurrent steps of first mixing of dry microspheres and the surface barrier liquid or mixture of such a liquid with a solid and then drying the microspheres to remove water and leaving the surface barrier liquid or mixture of such a liquid with a solid to coat the surface thereof. Subsequent or concurrent expansion of the microsphere is facilitated.

The discovery of the benefit of employing a surface barrier liquid or mixture of such a liquid with a solid has resulted in excellent properties, particularly the reduction of agglomeration, even at the lowest levels of surface barrier liquid or mixture of such a liquid with a solid, at high product quality. Agglomeration does not occur to any substantial degree in the expansion operation. Through control of the proportions of the liquid or mixture of such a liquid with a solid component, the expansion microsphere product may be a free flowing powder, a compacted powder, or a coherent, flowable mass.

III. SUMMARY OF THE DRAWINGS

IV. DETAILED DISCLOSURE

Figure 1:
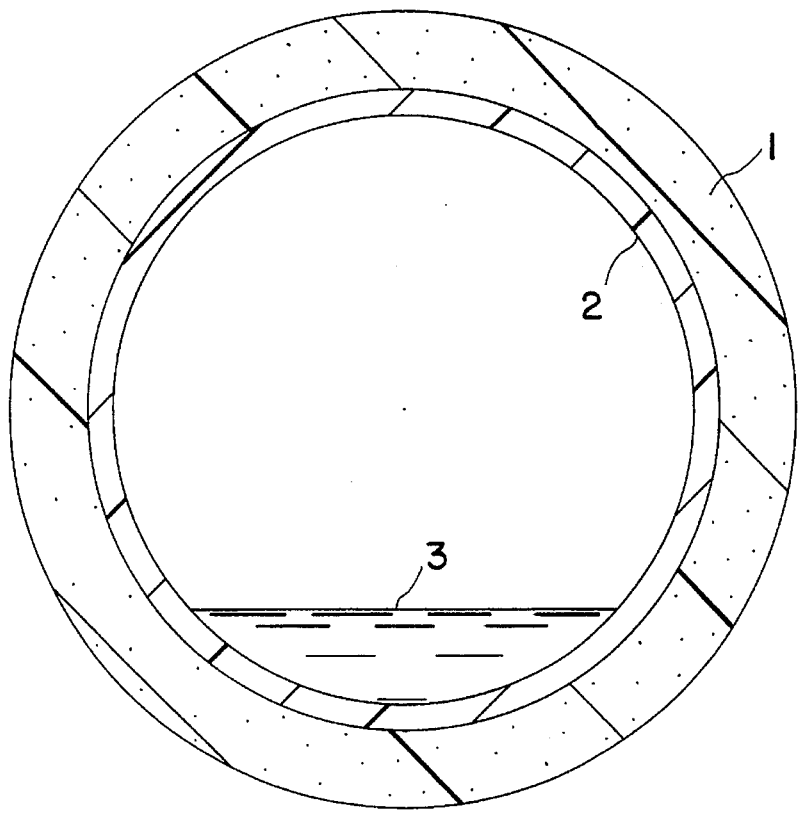
FIG. 1 is a schematic representation of the appearance of a microsphere of the present invention after drying, showing the microsphere with a thin film of barrier liquid or mixture of such a liquid with a solid adhered on the surface thereof.
Figure 2:
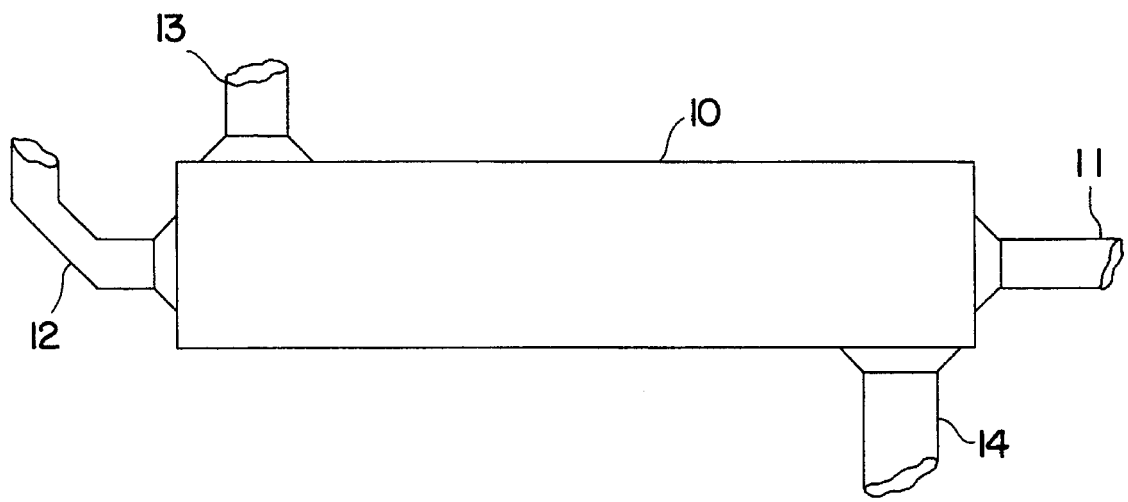
FIG. 2 is a schematic flow diagram showing the drying operation of the present invention as described in Example I, infra.

The most common uses of expanded, microspheres resides in the blending of these materials into a polymer binder system as a constituent in syntactic foam formulations. The exceptional ultra-low density characteristics has led to drastic changes in the ways in which the weight and volume relationships of such materials are considered. As a general rule of thumb, the addition of one percent by weight of the expanded microspheres will represent the substitution of about twenty percent by volume in typical systems.

The characteristics of the microspheres have precluded many approaches to their drying and expansion. Severe agglomeration and adherence of the materials to warm surfaces of equipment have eliminated most approaches to such procedures from serious consideration. Wet expansion in steam is of limited use when an aqueous system is not wanted, and the spray drying procedure is so expensive, and the product so prone to excessive, and extremely difficult, dusting problems, along with substantial agglomeration and limited expansion of the beads, that the effective development of the potential markets has been limited by such factors.

The occurrence of agglomerates has heretofore been considered the necessary result of the microsphere expansion. Even by the procedure of our prior patent, supra, it has been considered necessary to accept a level of agglomerates of from about 3 to 10 percent of the expanded beads, and in some conditions, far higher levels are common. We have now found, however, that a major contributing factor in the occurrence of agglomerates is to be found in the characteristics of the wet cake and the shortcomings of the expansion and drying procedures heretofore employed. We have learned that the wet cake must be subjected to adequate levels of mixing during the processing operation to assure complete separation of beads during the expansion in order to reduce agglomeration.

Our discovery of the significance of adequate mixing with the surface barrier liquid or mixture of such a liquid with a solid dictates that the mixing be sufficient prior to the expansion step and has led to other discoveries and substantial benefits that are achieved in the present invention. While these are set out in more detail, infra, they can be summarized as follows:

1. Expansion to the lowest densities heretofore achieved in the prior art procedures is now possible in a liquid based system. The microsphere density can be less than 0.03, often 0.02 to 0.015 g/cm$^3$.
2. Low proportions of the surface barrier liquid or mixture of such a liquid with a solid can be employed without agglomerates in the product.
3. Closer control of the bead expansion is achieved, resulting in lower proportions of under-expanded, over-expanded and disrupted beads.
4. Process control requirements are simple and equipment requirements are undemanding, permitting operation in inexpensive equipment with simple control requirements while still achieving high levels of product quality, uniformity and productivity.
5. The level of agglomerates consistently achieved, of less than 1%, often less than 0.1%, of the product permits the elimination of post-expansion processing to separate out agglomerates from the product.
6. The very low levels of over-expanded beads, disrupted beads, and bead fragments permits the elimination of post-expansion processing to separate out polymer fragments and other high density fractions.
7. The liquid surface barrier coating will facilitate subsequent or concurrent compounding operations, making mixing of the microsphere component into formulations and the achievement of homogeneous dispersion of the microsphere component faster, simpler and more reliable.
8. When a blend of both liquid and solid particulates are employed as a the surface barrier coating, a unique combination of properties can be provided.

9. When the surface barrier liquid is reactive in a subsequent compounded formulation, the physical properties of the end product, particularly impact strength and tear strength, are often considerably enhanced.

10. The combination of all the foregoing result in materially reduced production costs with materially increased product quality, and a broader range of products than heretofore available.

It has now been observed that surface barrier liquids can be employed, in surprisingly modest proportions by weight, which prevent agglomeration of the microspheres during drying and upon expansion, and that such materials actively and effectively suppress dusting of the expanded products as well. This combination of features and observations has led to the development of effective expansion of microspheres by first mixing the microspheres with the surface barrier liquid or mixture of such a liquid with a solid until the bead surface is fully wet, followed by controlled drying and recovery of the product. The microspheres remain in the desired unicellular condition, and substantially free of undesirable agglomeration. Subsequent or concurrent expansion can be up to the higher limits, as established by prior efforts in the art, to achieve microsphere densities less than 0.03 g/cm$^3$, and as low as 0.015 to 0.02 g/cm$^3$.

It is important to the present invention that in the context of most uses of the microspheres, it is the volumetric considerations which are most often of dominant importance, so that even quite substantial proportions of the surface barrier liquids on a weight basis form a negligible or very minor component on a volumetric basis. For example, employing DINP (di-isononyl phthalate) as the surface barrier, the volume and weight relationships of the dry, expanded microspheres with varying amounts of DINP show the relationships detailed in TABLE I.

TABLE I

EXPANDED MICROSPHERES BLENDED WITH DINP
MICROSPHERE CONTENT OF PRODUCT

| WEIGHT % | VOLUME % | COMPOSITE DENSITY (g/cm$^3$) |
|---|---|---|
| 90 | 99.8 | 0.022 |
| 80 | 99.5 | 0.025 |
| 70 | 99.1 | 0.028 |
| 60 | 98.6 | 0.033 |
| 50 | 98.0 | 0.039 |
| 40 | 97.0 | 0.048 |
| 30 | 95.4 | 0.064 |
| 20 | 92.3 | 0.092 |
| 10 | 84.4 | 0.169 |

NOTES: Data are based on Microspheres at 0.02 g/cm$^3$ and the DINP at 0.965 g/cm$^3$.

As the relationships in Table I show, even quite large proportions of DINP by weight represent a minor fraction of the volume of the expanded product. Particularly since it is possible to find such materials as entirely conventional plasticizers and the like in many polymer systems of interest for the use of the microspheres, it is generally preferred to employ such materials as the surface barrier liquids in the present invention. It will often be advantageous to employ more than one type of surface barrier liquid or mixture of such a liquid with a solid in mixtures and combinations with one another.

In most uses of the expanded microspheres, such materials will often be a constituent of the formulation intended by the end user in any event, and it is simply necessary to make corresponding adjustments in the loading of such components in the formulation to compensate if necessary for the increment included with the microspheres. A wide diversity of such materials will meet the functional requirements of the present invention, so that it is possible in almost all circumstances to find a surface barrier liquid or mixture of such a liquid with a solid compatible with the formulating requirements of the intended end use.

It has been observed that with appropriate levels of such surface barrier liquids, the tendency of the microspheres to agglomerate, or to stick to heated surfaces of drying equipment and expanding equipment is effectively eliminated, and the dusting of the final expanded product is materially reduced, if not effectively eliminated.

By the selection of non-flammable surface barrier liquids, or materials which are non-flammable under the conditions of the operating and processing characteristics of the mixture, it has become possible to employ equipment that permits effective subsequent or concurrent expansion at temperatures where the need for an inert atmosphere is eliminated without the introduction of substantial fire and explosion hazards. This represents a quite material reduction in manufacturing expense, and a real gain in system safety. The beads produced by the present invention are generally free from dusting, and do not require an inert atmosphere or other processing provisions intended to control dusting related hazards.

When necessary, of course, flammable materials may be employed as the surface barrier liquid or mixture of such a liquid with a solid, if adequate safety precautions are employed, although it will generally by preferred to avoid such materials whenever possible.

As those of ordinary skill in the art will readily recognize, there are a substantial number of parameters which govern the method and the products produced in the present invention. Each of the significant parameters is hereafter discussed in turn in relation to the present invention.

Microspheres are generally available in the form of a wet cake, which is typically about 40 percent water, about 60 percent unexpanded microsphere beads, and minor additional amounts of the materials employed in the manufacture of the beads by the process of the Morehouse patent, i.e., "wetting agents."

The most readily available microspheres are those available from Pierce & Stevens Corporation, 710 Ohio Street, P.O. Box 1092 Buffalo, N.Y. 14240-1092, which are predominantly polyvinylidene chloride microspheres with an inclusion of iso-butane as the blowing agent. Some of the microspheres presently available contain co-monomers in minor proportions in the bead polymerization. The available materials are preferred in the present invention, primarily for their availability and reasonable cost. The co-polymers generally have higher $T_g$ and expansion temperatures.

As the Morehouse patent indicates, microspheres can be made from a rather wide diversity of thermoplastic polymers. In practice, the commercially available microspheres are generally limited to polyvinylidene chloride or a random COPOLYMER of vinylidene chloride and acrylonitrile, or a random terpolymer of polyvinylidene chloride, acrylonitrile, and divinyl benzene. Microspheres of other materials, such as polyacrylonitrile, polyalkyl methacrylates, polystyrene, or vinyl chloride, are known, but these materials are not widely and generally available. The present invention is applicable to any thermoplastic of which microspheres is made, but since the polyvinylidene chloride based materials are those most readily available to the art, the discussion herein will be directed predominantly to those materials. As those of ordinary skill in the art will readily recognize, the processing parameters will require adjustment to accommodate differing polymer materials.

A wide variety of blowing agents can be employed in microspheres. Again, the commercially available materials are more limited in range, most often being selected from the lower alkanes, particularly propane, butane, pentane, and mixtures thereof, suited to the polyvinylidene chloride polymer. As the Morehouse patent clearly sets forth, the selection of the blowing agent is a function of the particular thermoplastic polymer employed, and in the context of the present discussion, those ordinarily used with the commercially available microspheres are given the greatest attention. Isobutane is most often used with polyvinylidene chloride microspheres.

In unexpanded form, the microspheres can be made in a variety of sizes, those readily available in commerce being most often on the order of 2 to 20 microns, particularly 3 to 10 microns. When expanded, these materials will have bead diameters on the order of 10 to 100 micrometers. It is possible to make microspheres in a wider range of sizes, and the present invention is applicable to them as well. It has been demonstrated, for example, that microspheres can be made from as small as about 0.1 micron, up to as large as about 1 millimeter, in diameter, before expansion. Such materials are not generally available.

While variations in shape are possible, the available microspheres are characteristically spherical, with the central cavity containing the blowing agent being generally centrally located.

Dry, unexpanded microspheres typically have a displacement density of just greater than 1 $g/cm^3$, typically about 1.1.

When such microspheres are expanded, they are typically enlarged in diameter by a factor of 5 to 10 times the diameter of the unexpanded beads, giving rise to a displacement density, when dry, of 0.1 or less, most often about 0.03 to 0.06. In the present invention is now possible to achieve expanded densities as low as 0.015 to 0.020 $g/cm^3$.

While the microspheres are produced in an aqueous suspension, it is common to break and de-water the suspension, and to supply the microspheres in the form of a "wet cake" of about sixty percent solids. This avoids shipping larger than necessary quantities of the aqueous system.

The solids content of the wet cake is substantially all unexpanded microspheres, but also includes the suspension components, including the wetting agents, so that the remaining water in the wet cake is extremely difficult to remove.

The drying operation is conveniently based on the use of conventional contact type, indirect heat exchange mixing driers with high speed, high shear capabilities. A wide diversity of types of equipment are applicable. In general terms, the requirements are for good temperature control, good mixing of powder and granular materials, and high shear, optionally with operation at reduced pressure provided, and the removal and recovery, preferably with condensation of the evaporated water. Active cooling of the microspheres, either in the mixing drier itself, or in ancillary equipment is also optional.

There is a great diversity of mixing driers available, at almost any desired scale of operations which meet the foregoing criteria with a capability of either batch or continuous operation in the context of the present invention. As a general rule continuous operation is preferred.

The surface barrier liquid or mixture of such a liquid with a solid in the present invention is any one of a wide diversity of materials which meet the requirements of the intended function. It is required that the surface barrier liquid or mixture of such a liquid with a solid be a free flowing liquid or mixture of such a liquid with a solid at the temperature and pressure of the drying operation, that it not react chemically with the microspheres, and preferably not with the other constituents of the system, e.g. the wetting agents and related components of the wet cake and, at the temperature of the expansion, that it function to separate the microspheres undergoing expansion so that they do not come into contact and bond to one another.

The surface barrier liquid or mixture of such a liquid with a solid may be selected from one or more components meeting the following general characteristics:

The barrier coating material should be a non-solvent for the thermoplastic polymer of the microspheres, and preferably should not swell the polymer of the microspheres.

The liquid should freely wet the surface of the microspheres.

The liquid should not polymerize, oxidize, degrade or otherwise react under the conditions of mixing, drying, handling, packaging or storage employed. It may, however, be a material selected to chemically react in or physically alter subsequent formulations into which the liquid-bead composite is compounded.

The liquid must have a melting point below the temperature of the drying operation, which may be conducted at any convenient temperature where water has a substantial vapor pressure, preferably at least about 100° C., and preferably where bead expansion does not occur, usually at least 20° C. below $T_g$ of the microsphere polymer.

If the surface barrier liquid has a melting point above ambient, it is preferred to cool the coated and dried microspheres below that temperature with mixing at a shear which produces a granular product.

In addition, the liquid should have a boiling point above, and preferably substantially above, the temperature of the drying process and the subsequent or concurrent expansion process.

The selection of suitable surface barrier liquids among the wide diversity of materials that meet the general characteristics required of such materials is generally a matter of balancing a number of functional requirements in the procedure of the invention and in the context of the intended uses of the product. Among the criteria that will guide those of ordinary skill in the art are the following:

The primary function of the surface barrier liquid or mixture of such a liquid with a solid is to prevent the microspheres from coming into direct contact with one another and with the surfaces of the processing equipment during expansion and thus to prevent them adhering. The barrier coating material wets the surface of the microspheres, and forms a barrier between the thermoplastic material and any other materials with which it might otherwise come into contact.

When the present invention is being conducted for a particular, known end use, it is ordinarily possible to tailor the selection of the surface barrier liquid or mixture of such a liquid with a solid to the requirements of use. It is generally desirable to consider the surface barrier liquid or mixture of such a liquid with a solid as a unit for unit replacement for the same material in the intended use. As those of ordinary skill in the art will readily recognize, the fact that the surface barrier liquid or mixture of such a liquid with a solid will adhere to the surface of the microspheres may be a factor that will require adjustment of proportions, but such requirements will not ordinarily be substantial or critical.

When combinations of different materials are employed as the surface barrier liquid or mixture of such a liquid with a solid, it is possible to stay within the compounding requirements of virtually any designed formulation.

By virtue of the cohesiveness of the surface barrier liquid or mixture of such a liquid with a solid, the composite product has a greatly reduced tendency to become entrained in gas streams or in the environmental atmosphere. As those of ordinary skill in the art will readily appreciate, the tendency to dusting is a material safety hazard, both in terms of exposure to workers and in terms of fire and explosive hazards. Since the microspheres contain an alkane blowing agent in substantial proportions, large quantities of these materials in the atmosphere presents a substantial problem in some circumstances. These difficulties, and the effort and expense of their resolution are minimized or eliminated altogether in the present invention.

By virtue of the increased cohesiveness of the composite, the demands on the processing equipment and system in recovering the expanded and dried microspheres is greatly facilitated, and product losses are substantially reduced. The microspheres are homogeneously dispersed in the liquid in a composite product. In most circumstances, the dried microspheres will be in a relatively dry, free-flowing granular form in cases where the melting point of the surface barrier liquid is above ambient. When the surface barrier remains liquid at ambient temperatures, the composite product will be a coherent, flowable floc-like mass at relatively high proportions of surface barrier liquid to microspheres. At lower proportions of the surface barrier liquid, the mass will remain relatively coherent, in the form of a number of loosely associated "clumps" which may be somewhat granular or powder-like in character. Such "granular flocs" permit the handling of the composite like a moist powder or granular material in solids handling and processing equipment, and still afford the compounding advantages of a liquid dispersion; these forms of the composite are accordingly generally preferred for the majority of applications. In the usual proportions, as described herein, the mass of the dispersion will exhibit a viscosity dependent on the specific liquid employed. The flocculation occurs with no agglomeration of the microsphere, which remain in discrete form. If the microspheres are subsequently or concurrently expanded, all the forgoing characteristics are preserved.

By virtue of the coherence provided by the flocculant-like action of the surface barrier liquid, even at very low proportions of the surface barrier liquid the product exhibits very low dusting. In addition, these same properties permit the drying of microsphere with very low relative proportions of the surface barrier when compared to particulate solids, and permits the effective production of the composite at lower densities than have been practical previously. In turn, syntactic foams made from the composite have the potential for lower densities as well.

While the surface barrier liquid wets the surface of the microspheres, when the composite is formulated into polymer systems and the like, the liquid will often be dissolved or dispersed in the system, and the surface of the microspheres will be wet with the final formulation rather than the surface barrier liquid, so that the final formulation has a greater homogeneity. In syntactic foams, for example, compression strength, compression set, impact strength, and some or all tensile properties will be improved. When the syntactic foam product is an adhesive, adhesive bond strength may be considerably enhanced.

These characteristics will not be lost if a particulate solid is employed in conjunction with the surface barrier liquid. Unlike our prior efforts, in such cases, the solid particulate will not be bonded to the surface of the microspheres, and will become dispersed into the binder matrix during compounding. The solids to be employed are those disclosed in our prior work as cited and discussed above, and incorporated by reference herein.

The selection of the surface barrier liquid, and the optional solid particulate, should be based on the end use intended for the composite, and is preferably a component desirable for inclusion in the intended formulation. The liquid is preferably a functional component of the product. The liquid material chosen may be, for example, a plasticizer, a surfactant or wetting agent which preferentially wets the surface of the microspheres, an extender or diluent, a solvent for components of the formulation (but not for the microspheres), a reactive monomer, oligomer, pre-polymer, or low molecular weight polymer, or even a polymer solution or non-aqueous dispersion. Other like materials may be employed from among the many common to the compounding of such formulations.

It is a characteristic of the present invention that the handling ease of a solid material is combined with the compounding and mixing ease of a liquid. As a result, processing is greatly facilitated, as the microsphere component will be dispersed into the formulations with the ease of mixing a liquid.

When a polymerizable or cross-linkable liquid is employed, a variant of the present invention becomes available, that of polymerizing or cross-linking to provide discrete microspheres coated with another polymer. The polymerization or cross-linking reactions may conducted at conditions which result in expansion of the microspheres or, if desired, at low temperatures where the microspheres remain unexpanded. Strong exotherms should be avoided, or controlled to avoid temperatures which are disruptive of the microspheres. Through such options, microsphere products which offer exceptional solvent and temperature resistance, and the like, may be produced. When such techniques are employed, it will ordinarily be preferred to include a solid particulate into the liquid to assure that the microspheres are not bonded together by the reaction, and remain in discrete form.

When such polymerizations or cross-linking reactions are employed, they may be thermally activated or catalyzed, addition or condensation polymerizations or cross-linking reactions may be employed, and the reaction may be conducted in air, inert gas atmosphere, in the presence of a solvent or dispersing medium, or in an interfacial reaction. Interfacial condensation reactions are of particular interest, whether liquid-liquid or vapor-liquid since these types of reactions offer great flexibility in the selection of reactants while still permitting the protection of the microspheres from the effects of constituents which may disrupt the microspheres.

The surface barrier liquid or mixture of such a liquid with a solid is used in the present invention in an amount sufficient to permit the expansion of the microspheres without sticking to the equipment employed or forming agglomerations of microspheres. While this amount will vary depending on the particular equipment employed, and with the particular processing conditions, the surface barrier liquid or mixture of such a liquid with a solid will most often be in the range of about 5 to 97 weight percent of the mixture of barrier coating material and microspheres, on a dry weight basis. As a general rule, in most circumstances the amount employed should be the least amount that will reliably and consistently achieve the defined function of the barrier coating material. It is generally preferred that the barrier coating material be employed in amounts less than 90 and preferably less than 80 weight percent of the blend. This normally results in a expanded product which is more than 90 volume percent microspheres. Because of the considerable surface area of the microspheres, less than about 5 weight percent of the surface barrier liquid may result in incomplete coverage which may lead to subsequent difficulties. In general it is preferred to employ at least about 10 weight percent of the surface barrier liquid.

Since the predominant concerns in most uses of microspheres is with the volumetric proportions, even quite considerable proportions by weight of the surface barrier liquid or mixture of such a liquid with a solid can be included without detriment in many end uses. When substantial amounts of the surface barrier liquid or mixture of such a liquid with a solid are introduced as a component of the microsphere formulation, appropriate allowances for this component should be made in the compounding of materials.

An excess of the minimum amount of surface barrier liquid or mixture of such a liquid with a solid required to prevent agglomeration may be employed when desired, but it is generally desirable to avoid proportions substantially greater than the amount which will reliably and completely wet the surface of the microspheres.

In the present invention, the optional expansion of the microspheres is accomplished by heating with active mixing, optionally at low pressure, in admixture with the surface barrier liquid or mixture of such a liquid with a solid. Contact drying processes employing indirect heat exchange are generally the most effective, but in the context of the present invention, must be adapted to accommodate the particular and unusual conditions of operation, as described infra.

The expansion operation may be conducted in a plow mixer, such as those available from Littleford Bros., Inc., of Florence, Ky. These mixers produce the vigorous mixing required to achieve complete dispersion and intermixing of the microspheres and the surface barrier liquid or mixture of such a liquid with a solid, and provides the heat exchange capacity to effectively remove the water from the mix. The mixer may be vented to provide for removal of volatiles, under reduced pressure or vacuum if appropriate.

In the present invention, the use of active mixing is employed in the mixing and, when employed, in the expansion steps. In prior processes, substantial shear was avoided to prevent rupture of the microsphere beads, particularly at higher temperatures employed to soften the surface of the beads to achieve expansion. We have observed that at the lower, very controlled temperatures employed for the operation of the present invention, the beads are not ruptured at quite substantial shear levels.

We observe that the operation of the plow mixer is generally sufficient to eliminate agglomerates in the final product. The fully expanded product is obtained substantially free of agglomerates, i.e. agglomerates constitute less than 1%, and often less than 0.1%, of the total product.

It will be clear to those of ordinary skill in the art that the term "active mixing" as employed in the present invention is ultimately a functional term, signifying a level at least sufficient to eliminate aggregates in the dried product, and less than the level at which significant disruption of the beads occurs. Specific values of the minimum and maxima will be dependent on the specific equipment employed and the particular conditions of its usage and operation.

The plow mixer is operated at temperatures at which expansion occurs, affording exceptional control over the process. When mixing and expansion are complete, the surface barrier liquid or mixture of such a liquid with a solid will form a substantially homogeneous blend with the microsphere beads substantially free of agglomeration. The microsphere component can be expanded to a density as low as about 0.015 grams per cubic centimeter.

The expansion can be carried out in any convenient equipment, in either batch or continuous operations suited to effect heat transfer to the microspheres. Since the adherence of the surface barrier liquid or mixture of such a liquid with a solid is maintained at expansion temperatures, and since the water, was previously removed, only the thermal requirements for expansion need to be considered and controlled.

It has been found that the homogeneous blend produced in the mixture can be expanded with low shear mixing to aid in uniform and efficient heat transfer by indirect heat exchange in very simple and inexpensive equipment. High speed, high shear mixing is not required in the expansion operation, so long as the dry beads to be expanded already have reduced agglomerates and have been fully wet and achieved sufficient homogeneity in the blend.

While the expansion can be conducted in the plow mixer, it will generally be desirable to expand, continuously if desired, in faster, less expensive equipment. Suitable for such use are the Solidaire® continuous heat transfer units available from Bepex Corporation of Rolling Meadows, Ill.

The expansion equipment must provide the energy for the expansion alone. This is not large, and in most circumstances achieving a bead temperature (depending on the specific polymer) at which expansion occurs, as previously defined, there will be little difficulty in attaining the desired degree of expansion. In most circumstances, full expansion is desired, i.e., to a microsphere density of less than 0.03 g/cm$^3$, preferably about 0.02 g/cm3 (without the surface barrier liquid or mixture of such a liquid with a solid).

The important temperature limitations are defined by the thermoplastic polymer. It is important not to melt the polymer mass, so that the hollow spherical structure is lost through over expansion. On the other hand, if the temperature is not high enough to soften the polymer and to develop an adequate pressure of the blowing agent, expansion may not occur, or may be insufficient. Residence time at the appropriate temperature is also a useful control parameter, since there is a definite duration of the expansion process. Even when adequate temperatures are achieved, if the residence time at temperature is too short, the expansion may be insufficient. If the time is too long, the microspheres themselves may be over-expanded and disrupted, leaving broken spheres and polymer fragments and grit in the product, with attendant losses of production. While heat transfer rates are generally dependent on the specific equipment employed, residence times on the order of 0.5 to 3 minutes are often sufficient.

The temperatures for expansion are generally near, but not materially above, the glass transition temperature of amorphous materials and the melting temperature of crystalline polymers. These matters are discussed in more detail in the Morehouse patent.

It is the function of the surface barrier liquid or mixture of such a liquid with a solid to prevent the formation of aggregates of the microspheres to the maximum attainable degree. In most equipment this particular requirement is facilitated by the use of continuous, low shear mixing of the material in the expander. Effective mixing also promotes even and uniform heat transfer to the particulate materials.

The degree of expansion can range from substantially none, to the known limits of expansion. This parameter is determined by the temperature, the residence time at temperature, and to a lesser degree, by the pressure in the system.

Expansion requires that the blowing agent develop a substantial internal pressure (as compared with the external pressure), and that the polymer become softened enough to flow under the effect of the internal pressure. This generally means that the polymer must be heated to a point near its melting or glass transition temperature, or very slightly above, typically about 120° C. for polyvinylidene chloride homopolymer based microspheres. If the polymer temperature is too high, the microspheres will over-expand, burst, and collapse. The upper limit of temperature should be about 180° C. for the co-polymer beads, and preferably no higher than 150° C. for polyvinylidene chloride. At these higher temperatures, the residence time at temperature should be brief.

As the temperature is raised to the point at which the microspheres begin to soften and expand, and their surface area becomes tacky, the surface barrier liquid or mixture of such a liquid with a solid wets to the surface and prevents agglomeration, and good mixing operates to maximize the extent of heat transfer to the microspheres at this stage in the process. The extent of the mixing is not narrowly critical, so long as the mixing maintains a uniform, substantially homogeneous blend of surface barrier liquid or mixture of such a liquid with a solid and microspheres and relatively even heat transfer is obtained.

It is generally preferred to permit the dried and expanded microspheres to cool before they are collected and packaged or otherwise handled. This minimizes the degree to which handling can disrupt the bead structure while the polymer is in the plastic state. Active cooling may be employed if desired.

The resulting microspheres with their coating of the surface barrier liquid can be conveniently recovered from the expander, collected and handled by entirely conventional procedures and equipment usually employed in such operations for dealing with powdered or granular materials. When unusually high proportions of the surface barrier liquid are employed, handling equipment usual for such liquids may be employed.

The result of the process is the production of a unique form of the microspheres. The microspheres will have an adherent surface coating of the surface barrier liquid or mixture of such a liquid with a solid. The liquid or mixture of such a liquid with a solid will completely coat the surface in a substantially continuous layer. By varying the proportions of the barrier coating material and the microspheres, the thickness of the coating may be controlled.

The microspheres of the present invention will often have a low incidence of deformed, non-spherical shapes when compared to the dried and expanded microspheres from the processes of the prior art. It has been found that the level of disrupted microspheres, where the hollow structure with a continuous form is broken, are not frequent, and are as low or even lower than the norms of the prior art processes.

The microsphere product of the present invention can be expanded to very near the limit of expandability, i.e., to a density of less than about 0.03, often 0.02 or even 0.015 g/cm$^3$. Higher densities are also possible. When the barrier coating material is taken into account, the composite density will, of course, be somewhat higher. Thus the composite density of the product will be determined by the density of the particular barrier coating material employed, the amount of the barrier coating material included, and the degree of expansion. Those of ordinary skill in the art will be able to readily determine the composite density of the product from the information and guidance provided in the present disclosure.

Most importantly, the expanded beads of the present invention will have less than one percent, and often less than 0.1 percent agglomerates. In the present invention, this signifies that at least about 99 percent of the product, and preferably at least about 99.9 percent, will pass a 100 mesh screen. This compares to the prior art dry expanded beads produced by our prior method or by spray drying where acceptable results have represented product wherein from 3 to 10 percent is retained on an 80 mesh screen, while only about 97 percent, and often as little as 90 percent will pass a 100 mesh screen. In many circumstances, particularly when the microspheres exceed about 30 weight percent of the blend, even higher levels of agglomerates, well in excess of 10 percent of the product, may be retained on the 80 mesh screen by the prior art procedures. In the present invention, the very low level of agglomerates is attained up to 80 percent by weight (in excess of 99 percent by volume). Such low proportions of the surface barrier liquid or mixture of such a liquid with a solid may be highly desirable in some applications of the product.

The foregoing description is general in scope. For the particular guidance of those of ordinary skill in the art, the following specific examples are intended to provide particular demonstrative guidance in the practice of the present invention.

EXAMPLES

The present invention is illustrated in the following results, set out in Table II, wherein six formulations of microspheres with four different surface barrier liquids are employed to illustrate the drying, and the optional expansion of the microspheres.

In preparation of the composites reported in Table II, microsphere wet cake of the indicated type and the surface barrier coating liquid are charged to a high shear mixing vessel provided with a heating jacket and venting to a vacuum source. Mixing was initiated, pressure within the vessel was reduced to about 250 mm Hg., and the temperature was increased over about ten minutes to 110° C., and then held at that temperature for a period of ten minutes. At that time, the temperature was gradually raised over an additional fifteen minutes to a peak temperature indicated in Table II, and held at that temperature for a period of two minutes. The mixing and vacuum were stopped and ambient air vented into the vessel to cool the composite, which was examined and found to have the properties reported in Table II.

As the data in Table II indicate, a wide variety of materials, proportions, and composite densities are readily obtained:

TABLE II

| MICROSPHERE | | | LIQUID | | | PROCESS | COMPOSITE |
|---|---|---|---|---|---|---|---|
| Type | Wt % | Density | Type | Wt % | Density | TEMP. | DENSITY |
| A | 66.7 | .060 | A | 33.3 | 0.97 | 386 | .088 |
| B | 71.4 | .050 | B | 28.6 | 0.965 | 330 | .070 |
| B | 71.4 | .015 | C | 28.6 | 0.965 | 330 | .021 |
| B | 83.3 | .140 | D | 16.7 | 0.965 | 291 | .166 |
| B | 93.7 | .084 | D | 6.3 | 0.965 | 291 | .079 |
| A | 71.4 | .128 | D | 28.6 | 0.965 | 380 | .128 |

Notes:
Microsphere Type A is a wet cake of an unexpanded 5 micrometer diameter terpolymer microsphere of vinylidene chloride, acrylonitrile, and divinyl benzene, having a Tg of about 180° C., and an unexpanded density of 1.1, and a fully expanded diameter of 50 micrometers at a density of 0.015 grams per cubic centimeter.
Microsphere Type B is a wet cake of an unexpanded 5 micrometer diameter microsphere of vinylidene chloride having a Tg of about 125° C., and an unexpanded density of 1.1, and a fully expanded diameter of 50 micrometers at a density of 0.015 grams per cubic centimeter.
Liquid Type A is a 120° C. melting point microcrystalline wax, solid at room temperature.
Liquid Type B is dioctyl phthalate.
Liquid Type C is Dow Corning Silicone fluid DC-200.
Liquid Type D is a silicone wetting agent PA-57.
Densities are given in grams per cubic centimeter. Processing Temp. is in degrees F.

VI. CLAIMS

What is claimed is:

1. The method of making microspheres substantially free of water and with a coating of adherent surface barrier liquid or a mixture of such a liquid with a solid, said microspheres being substantially free of agglomerates, comprising the steps of:

A. first combining expandable thermoplastic microspheres and a surface barrier liquid or mixture of such liquid with a solid material, wherein said surface barrier liquid is a liquid which wets the surface of said thermoplastic and having a boiling point at a temperature above the expansion temperature of said thermoplastic microspheres, and causing said liquid to wet the surface of said thermoplastic;

B. subjecting said mixture to high shear mixing sufficient to disrupt or prevent the formation of agglomerates of microspheres, and concurrently heating the admixture for a time and temperature sufficient to remove substantially all water from said microspheres; and C. collecting composite microspheres with an adherent coating of said surface barrier liquid or mixture of such a liquid with a solid and substantially free of agglomerates.

2. The method of claim 1 wherein said liquid is a member selected from the group consisting of plasticizers, monomers, oligomers, pre-polymers, and low molecular weight polymers, extenders, diluents, non-aqueous solvents, wetting agents, and mixtures thereof.

3. The method of claim 1 wherein said liquid is added in an amount sufficient to form a floc of said microspheres.

4. The method of claim 1 wherein said mixture is heated to a temperature sufficient to expand said microspheres.

5. The method of claim 1 wherein said mixture is heated at reduced pressure to accelerate removal of water.

6. The method of claim 1 wherein said microspheres are added as wet cake, having about 25 to 50 weight percent water.

7. The method of claim 2 wherein said liquid is a component of a polymerization or cross-linking reaction, and wherein said reaction is conducted to form a syntactic polymer foam.

8. The method of claim 2 wherein said liquid is a plasticizer, and wherein the liquid coated microspheres are incorporated into a plastisol.

9. A microsphere having a coating of an adherent surface barrier liquid or mixture of such a liquid with a solid material comprising the product of the process of one of claims 1–8.

* * * * *